United States Patent
Saito

(10) Patent No.: US 8,018,660 B2
(45) Date of Patent: Sep. 13, 2011

(54) ZOOM LENS SYSTEM AND IMAGE PICKUP APPARATUS INCLUDING THE SAME

(75) Inventor: Shinichiro Saito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 12/565,978

(22) Filed: Sep. 24, 2009

(65) Prior Publication Data
US 2010/0103532 A1 Apr. 29, 2010

(30) Foreign Application Priority Data
Oct. 23, 2008 (JP) ................................. 2008-272917

(51) Int. Cl.
*G02B 15/14* (2006.01)
(52) U.S. Cl. ...................................... 359/687
(58) Field of Classification Search .................. 359/687, 359/676, 684, 774
See application file for complete search history.

(56) References Cited

U.S. PATENT DOCUMENTS
6,118,593 A 9/2000 Tochigi
7,199,942 B2 4/2007 Miyazawa
2006/0146417 A1 7/2006 Hoshi
2008/0310033 A1* 12/2008 Miyazawa .................... 359/687

FOREIGN PATENT DOCUMENTS
JP 2000-227548 A 8/2000
JP 2002-182109 A 6/2002
JP 2002-287027 A 10/2002

* cited by examiner

*Primary Examiner* — Alicia M Harrington
(74) *Attorney, Agent, or Firm* — Canon USA, Inc. IP Division

(57) ABSTRACT

A zoom lens system includes, in order from an object side to an image side, a first lens unit having a positive refractive power, a second lens unit having a negative refractive power, a third lens unit having a positive refractive power, and a fourth lens unit having a positive refractive power. The third lens unit is stationary and the second and fourth lens units move along an optical axis during zooming. The fourth lens unit consists of a cemented lens in which a positive lens element and a negative lens element are cemented together. The zoom lens system satisfies the following conditional expression:

$$7.5 < |R42|/TD4 < 20.0$$

where R42 denotes a radius of curvature of a cemented surface of the cemented lens, and TD4 denotes a thickness of the fourth lens unit along the optical axis.

8 Claims, 17 Drawing Sheets

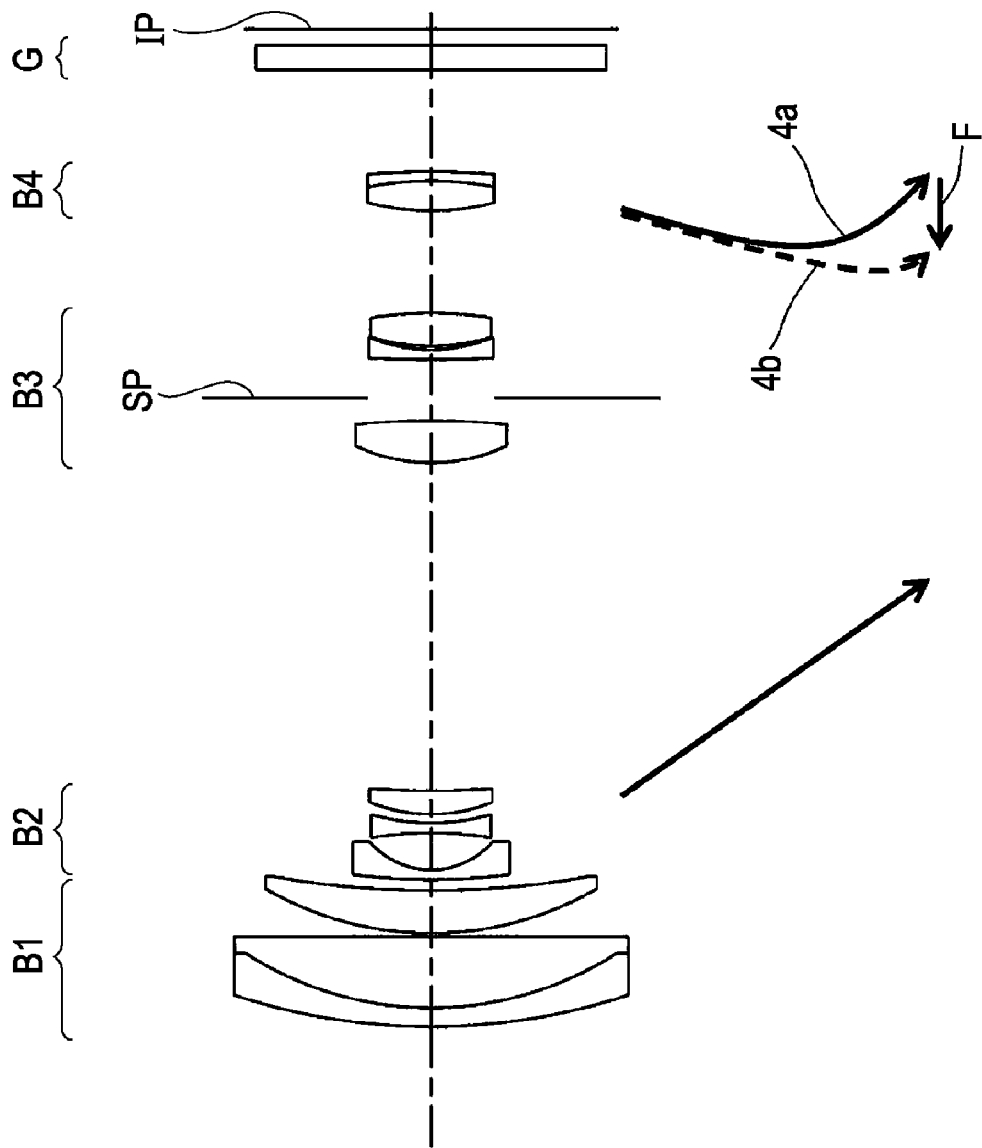

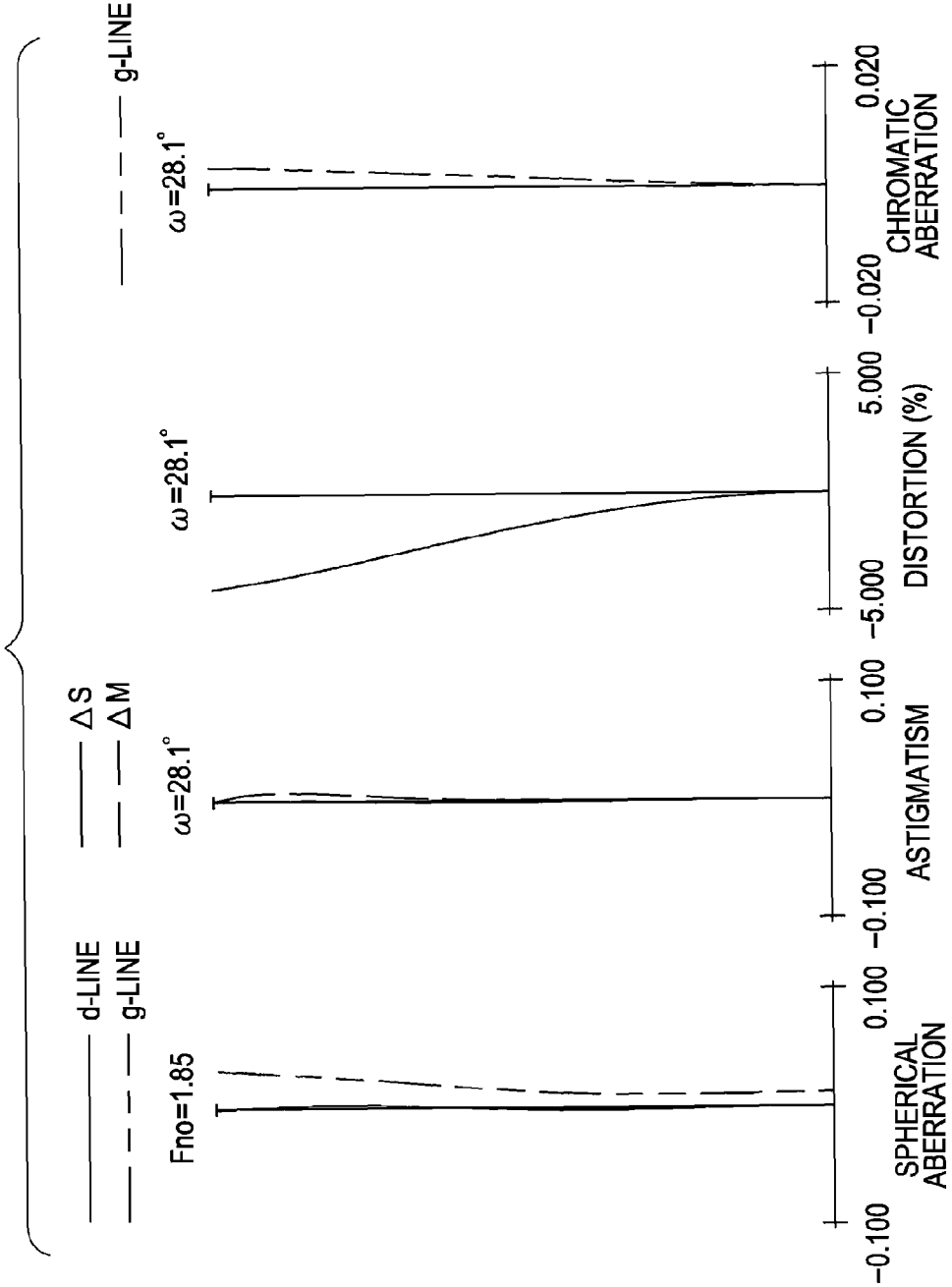

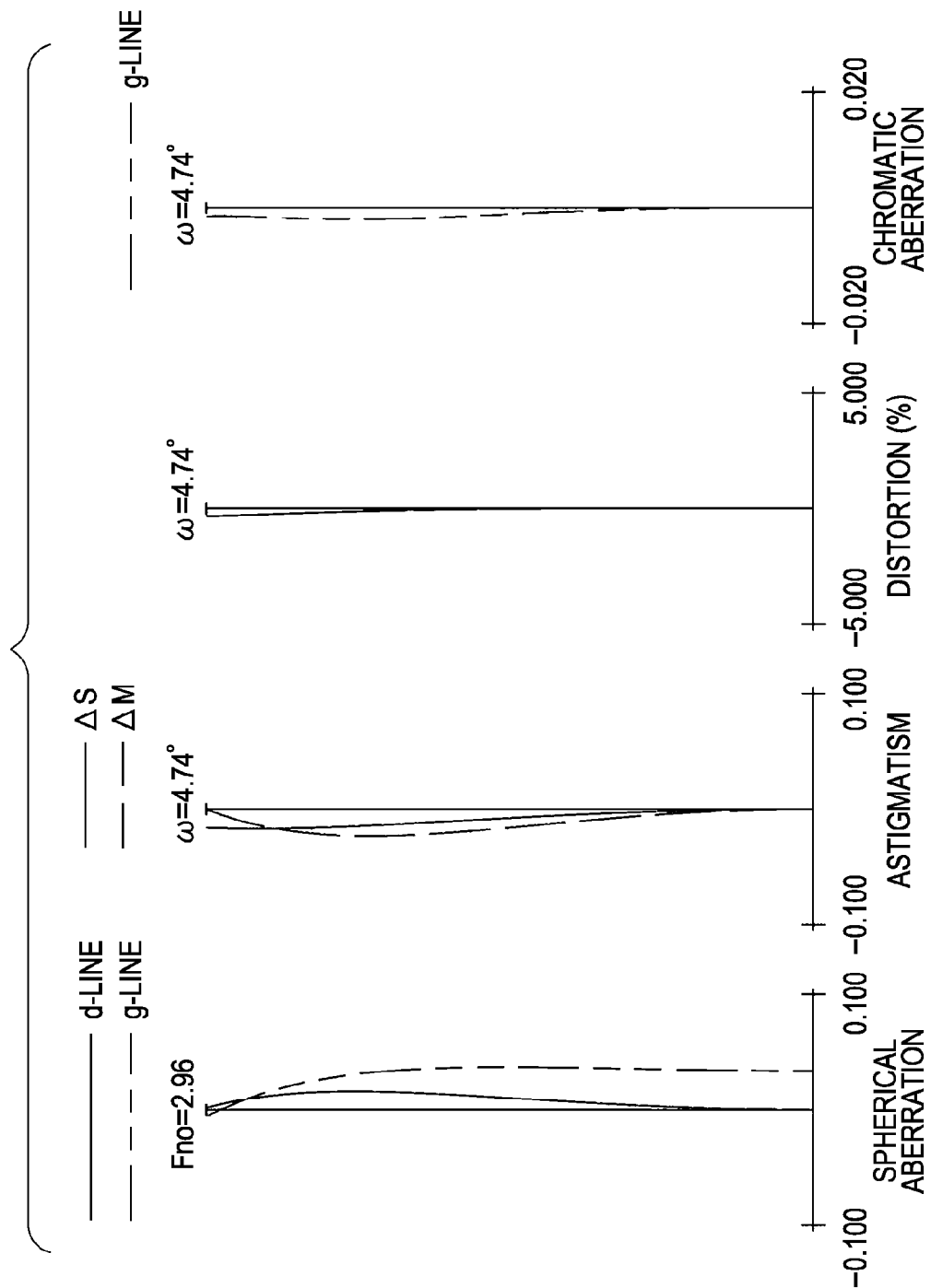

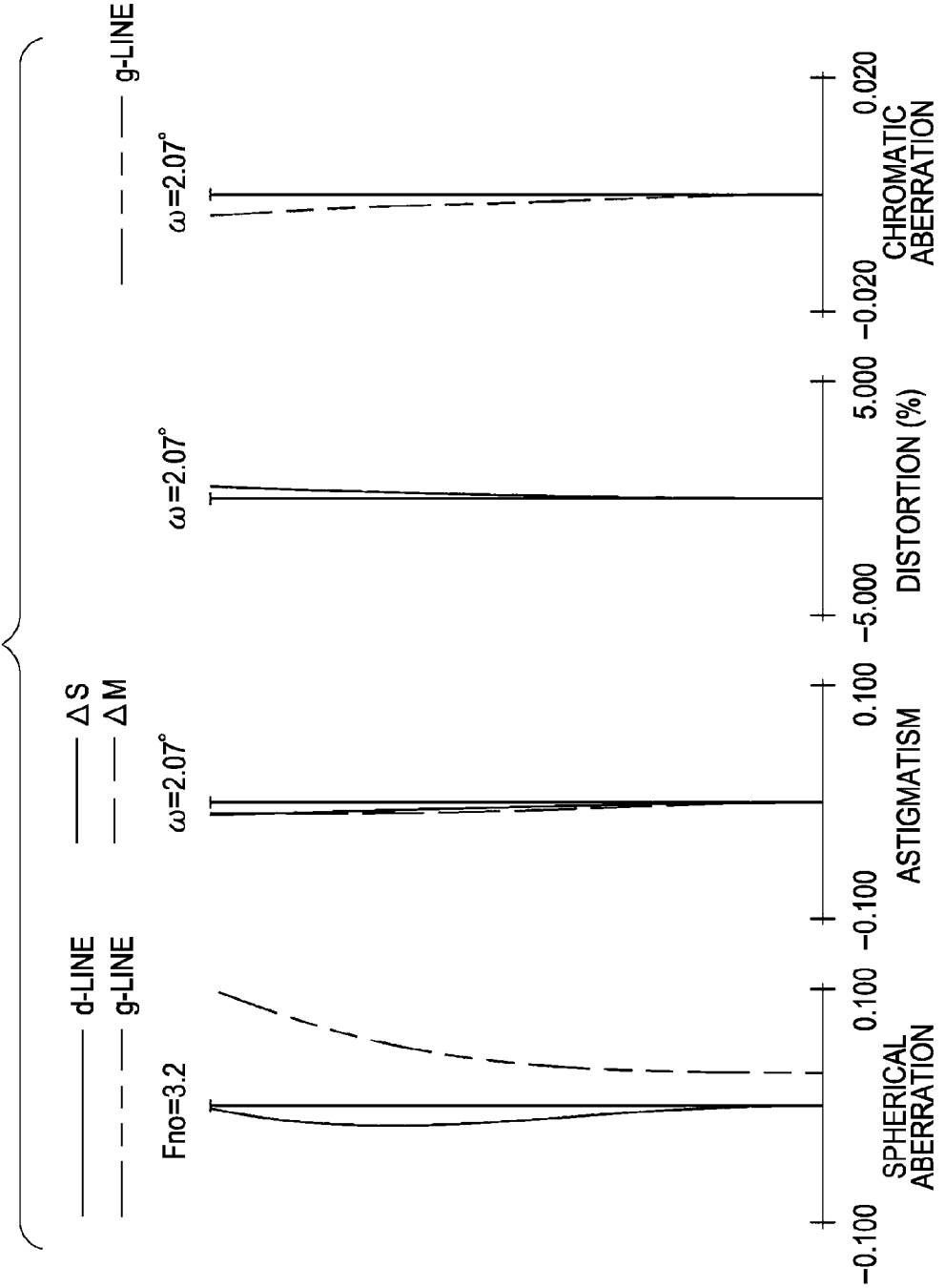

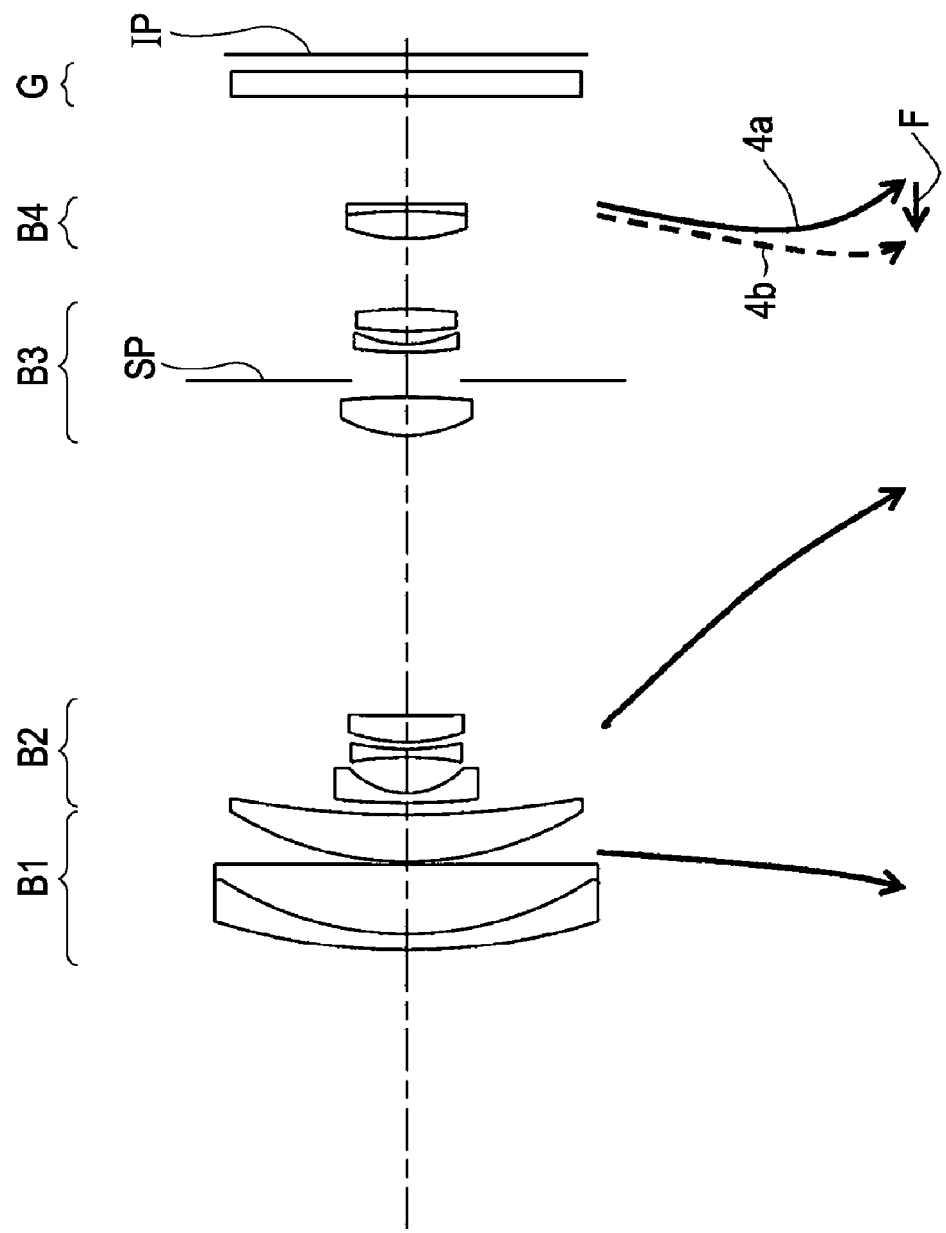

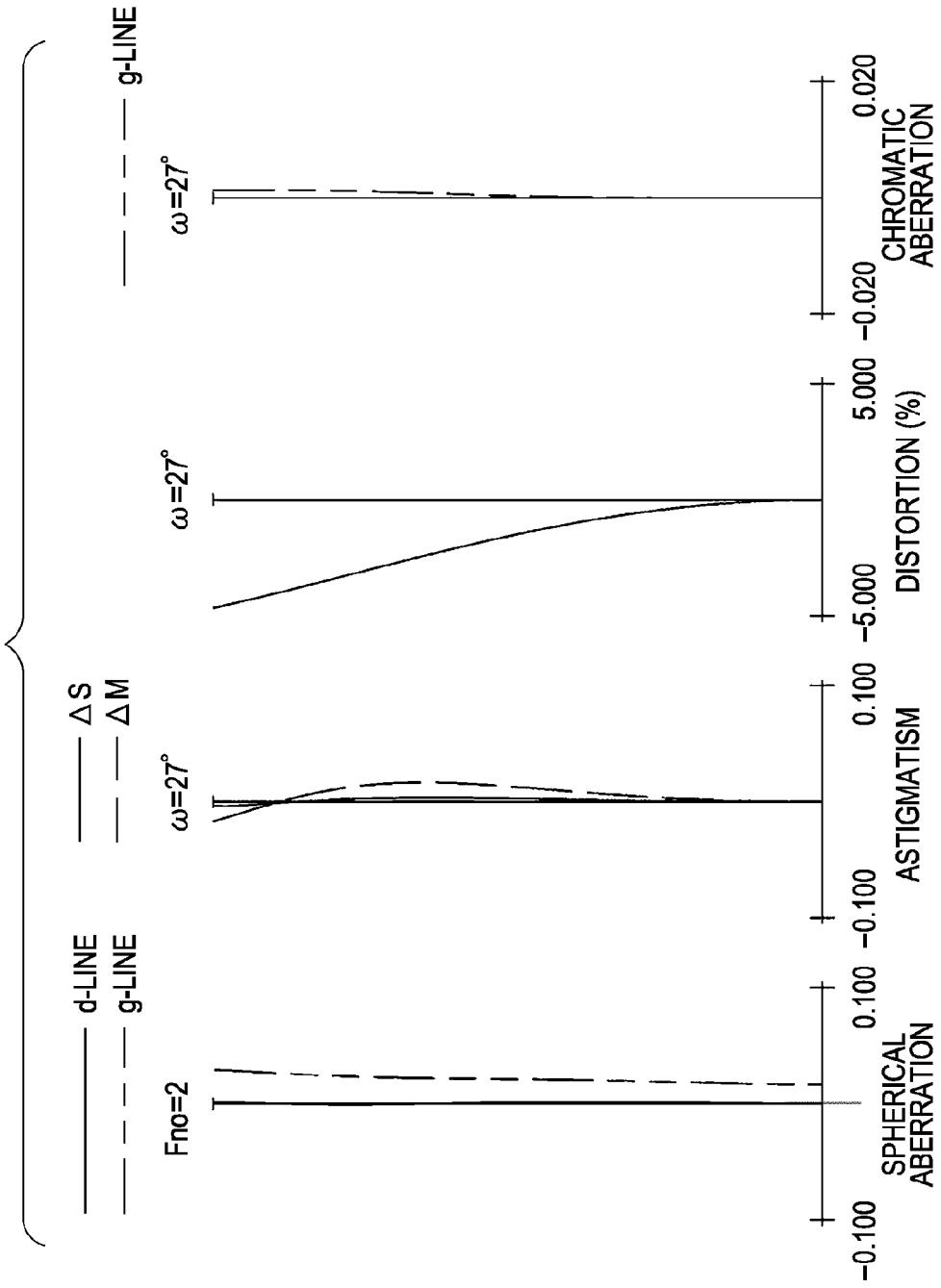

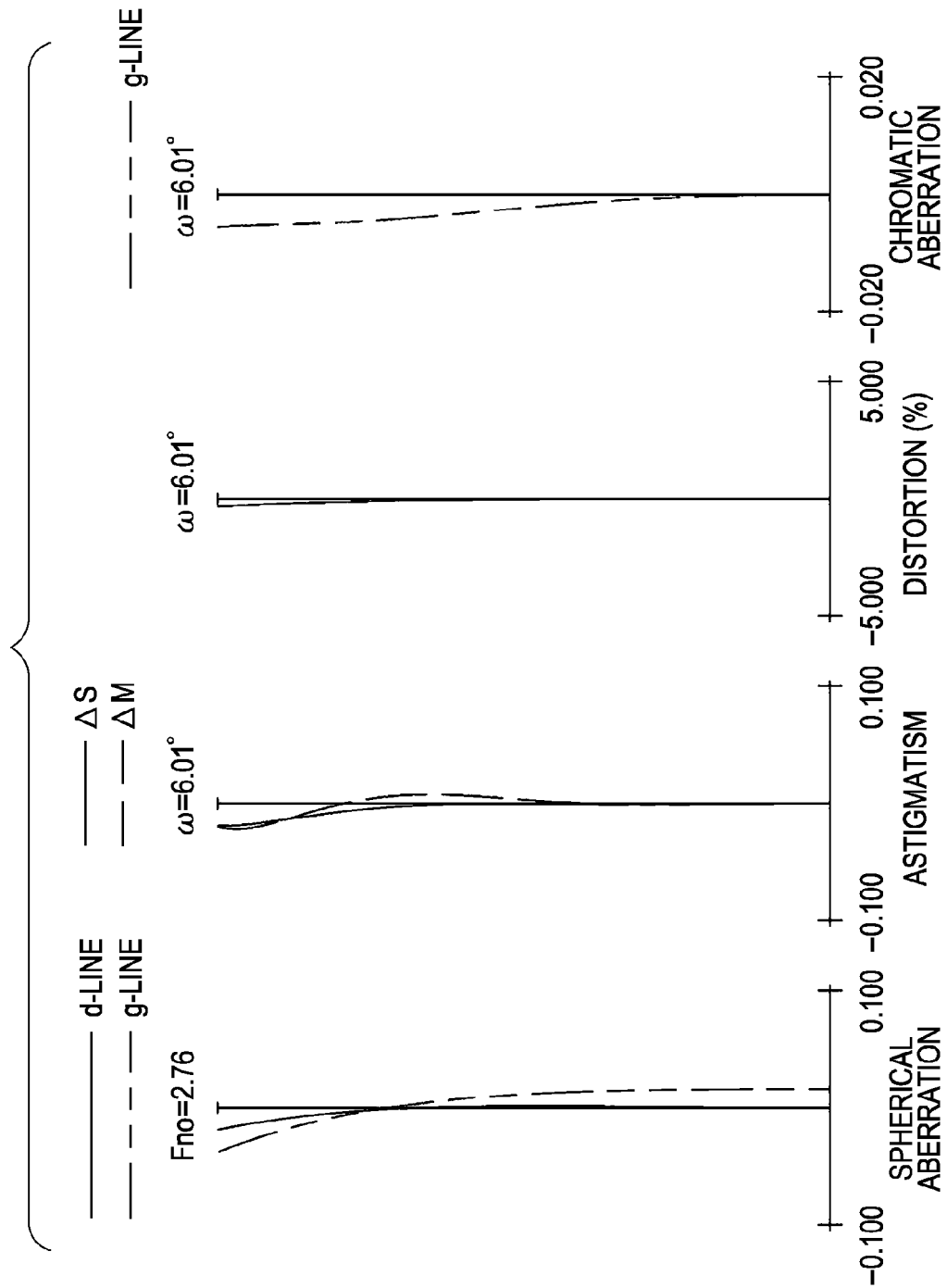

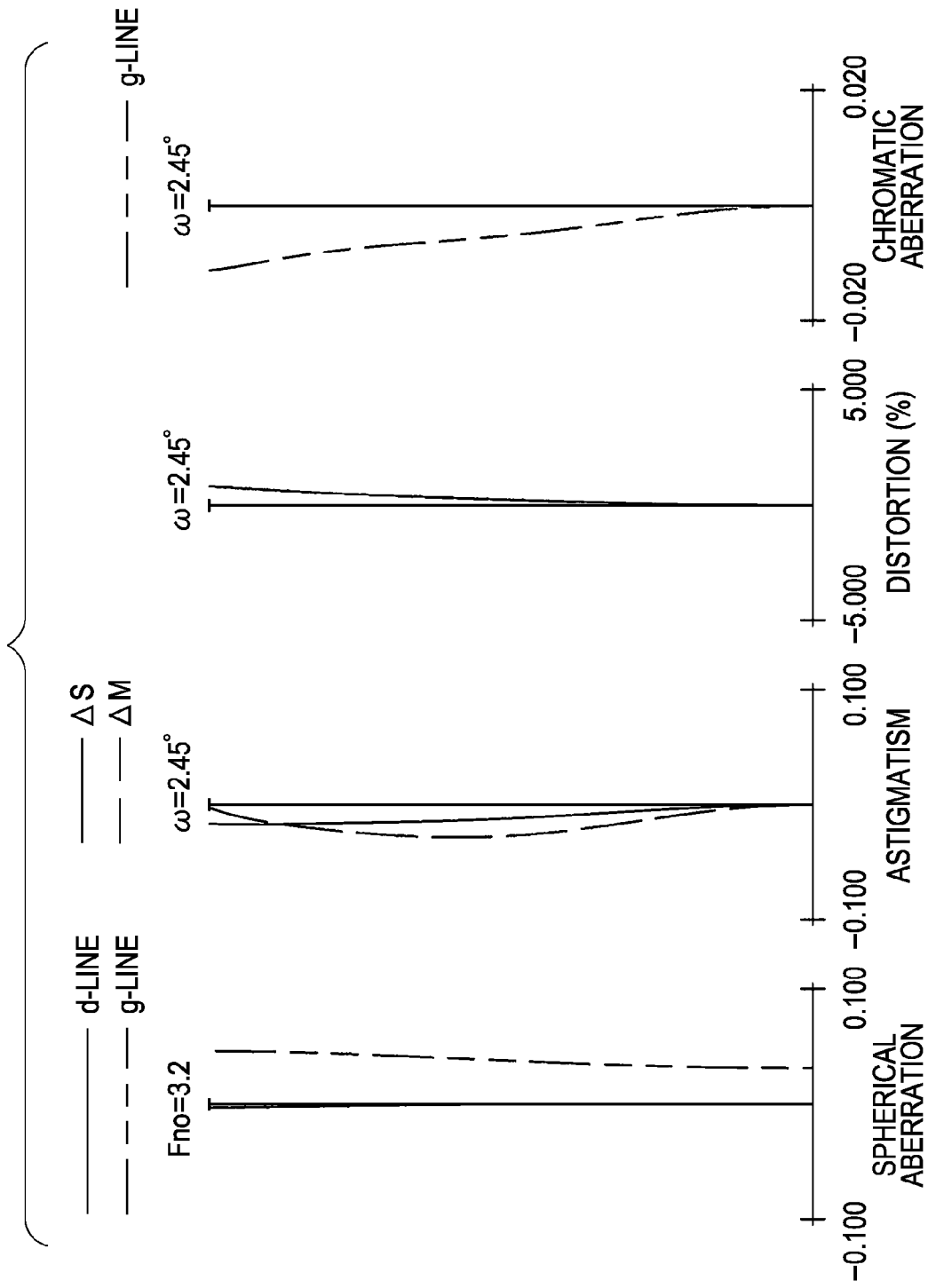

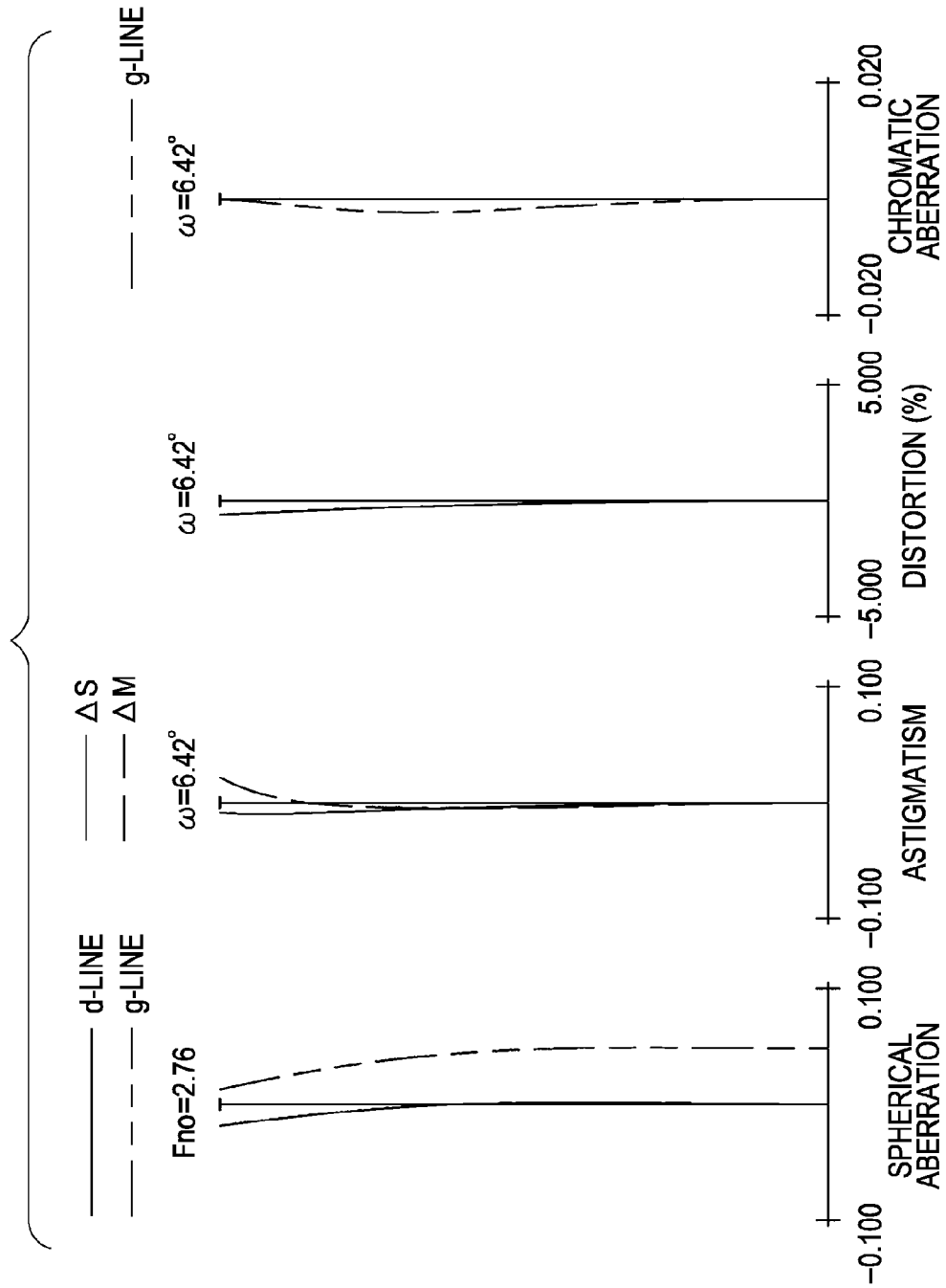

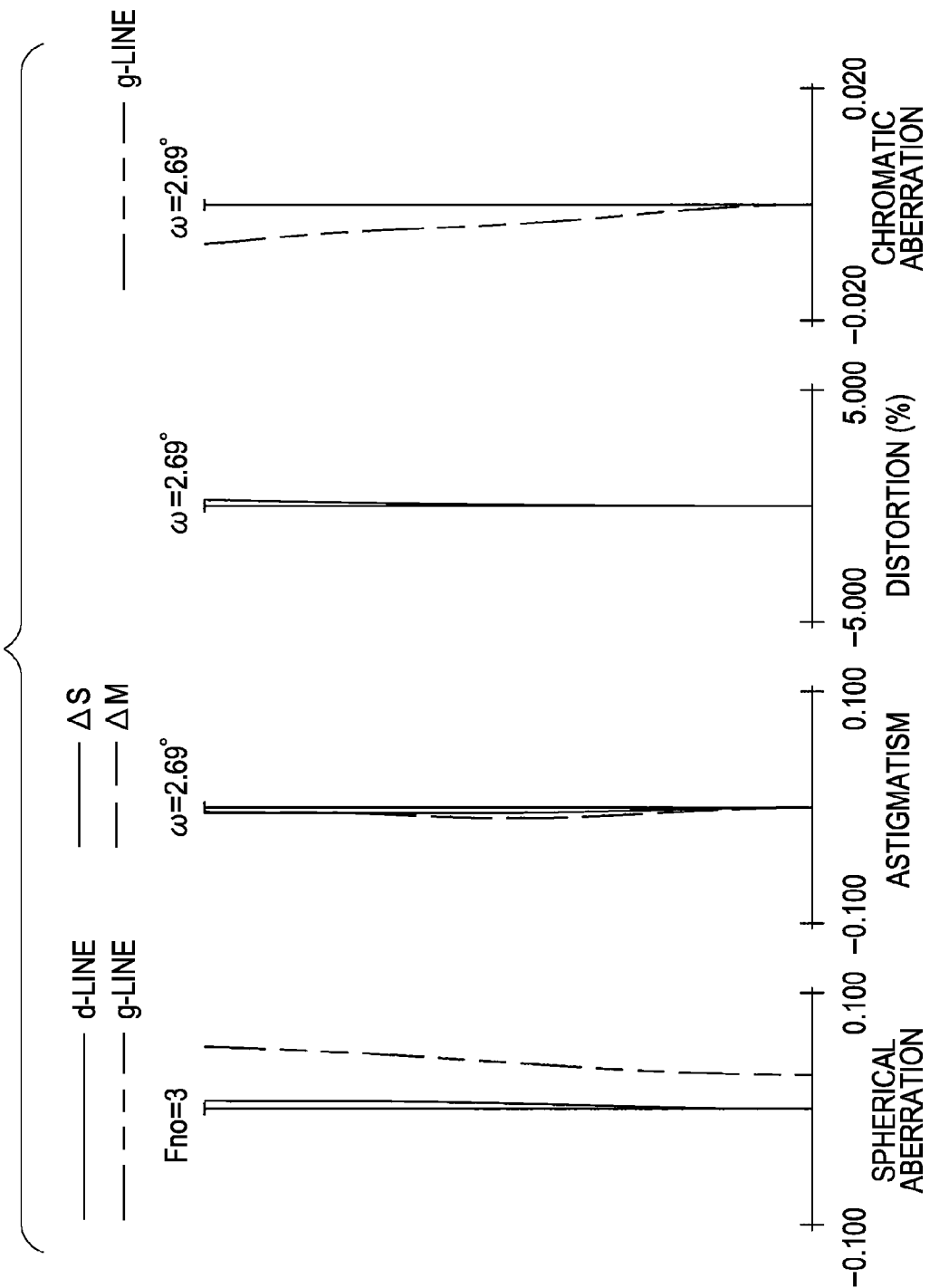

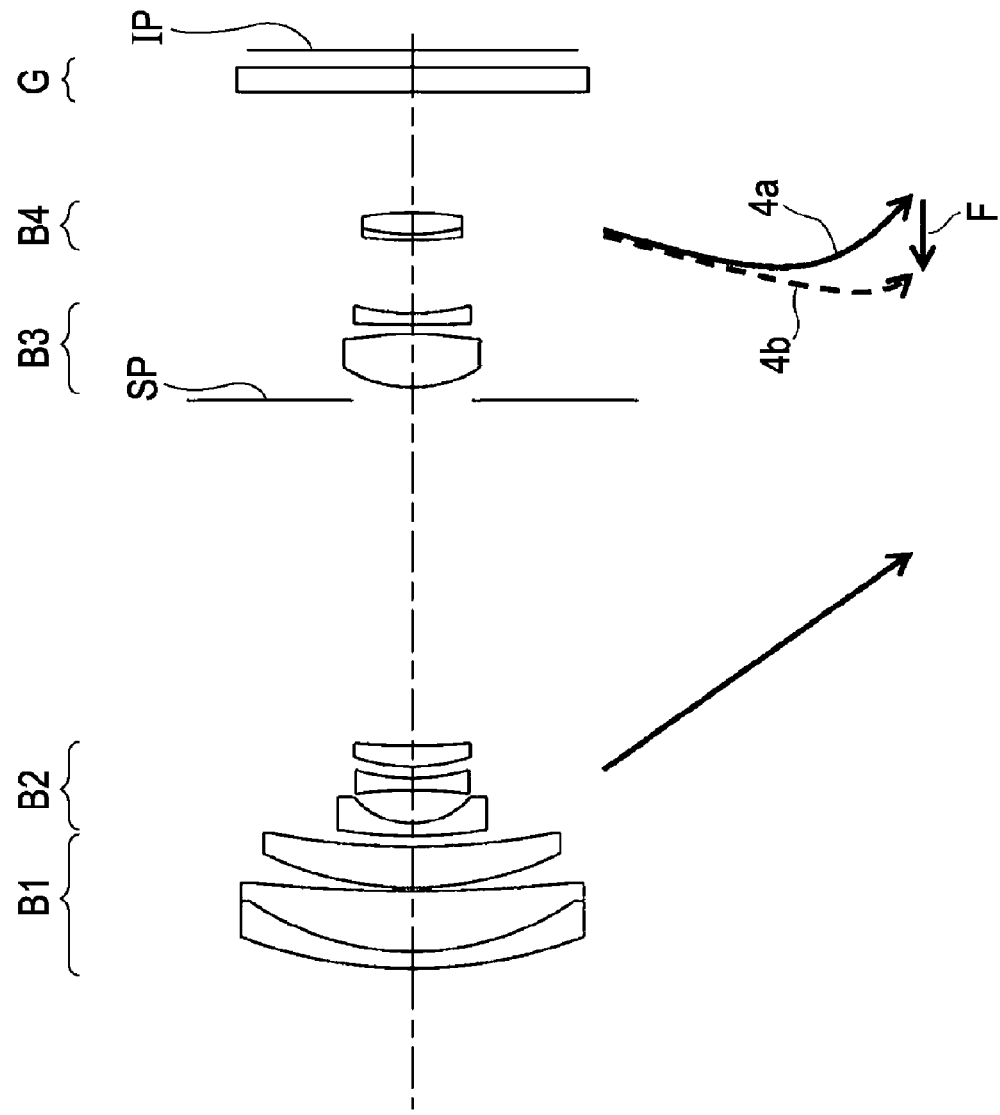

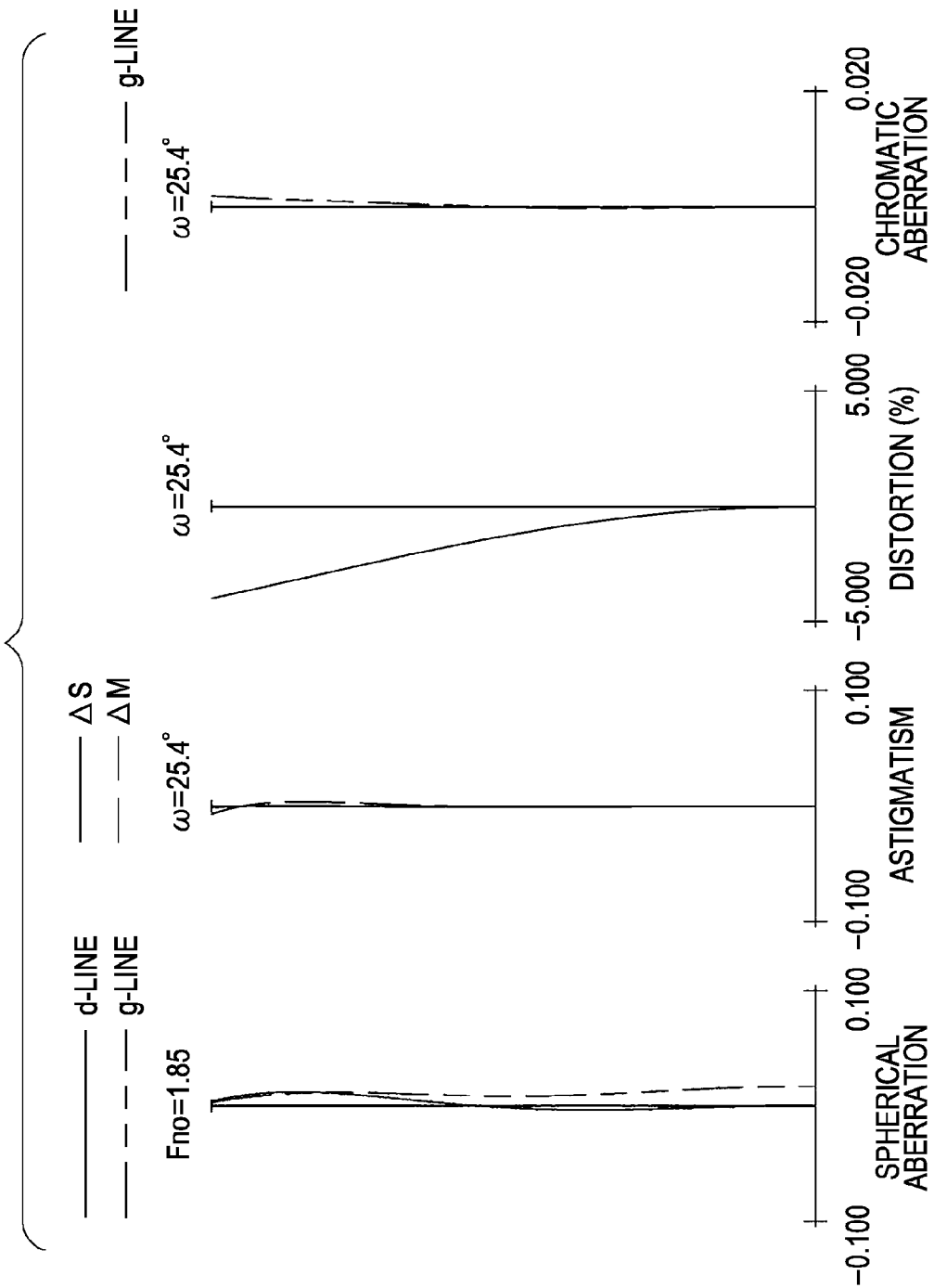

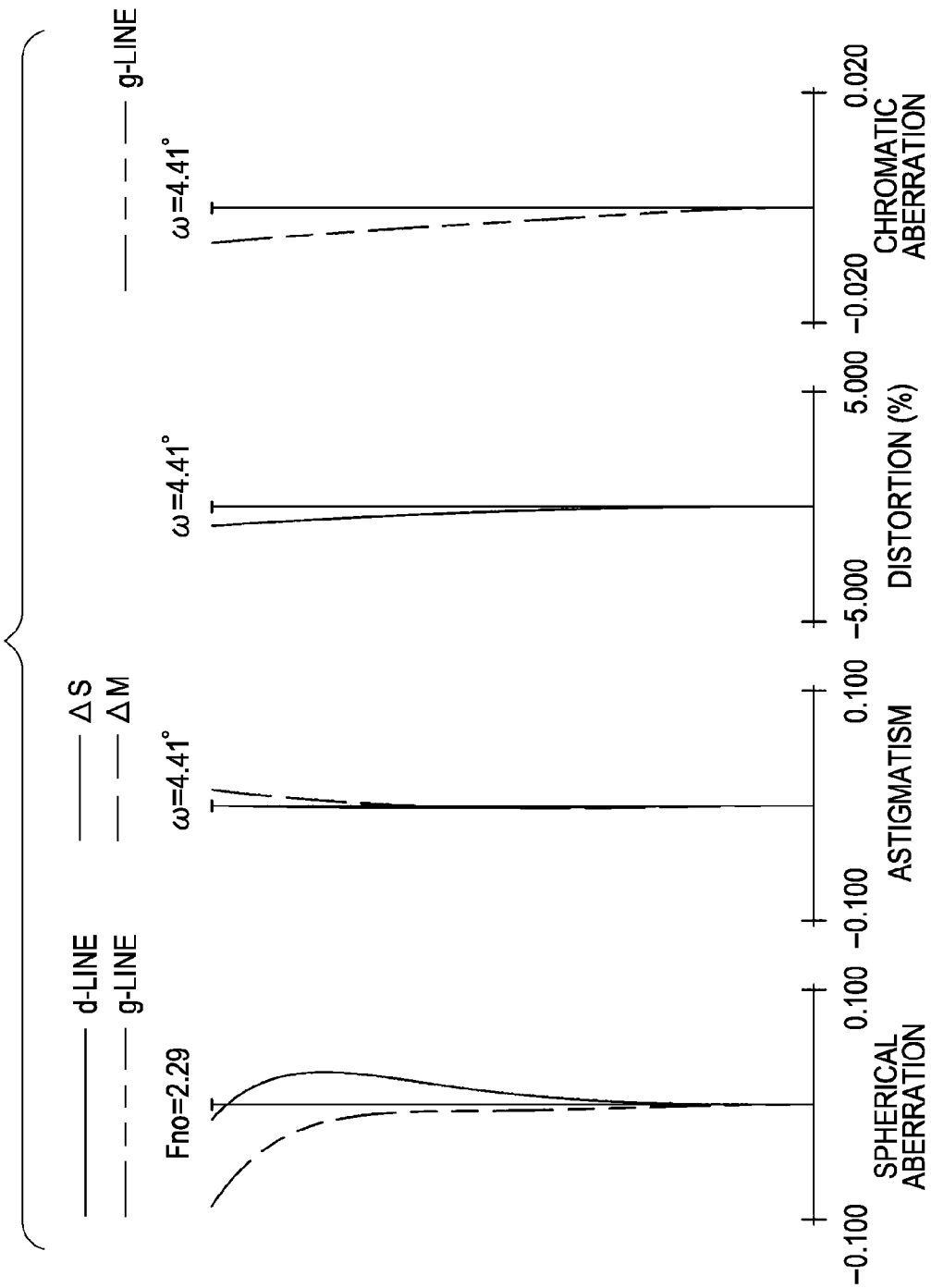

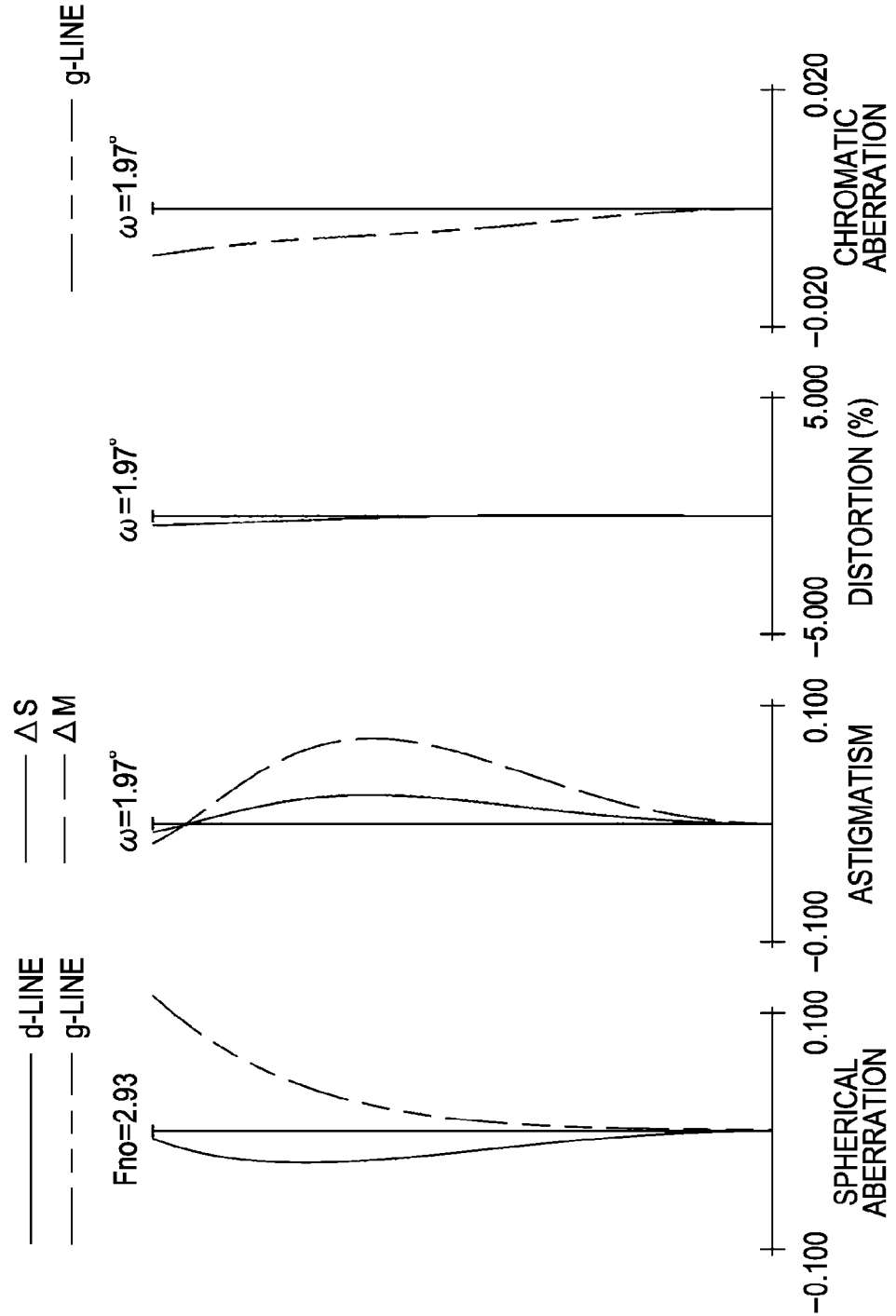

ZOOM LENS SYSTEM AND IMAGE PICKUP APPARATUS INCLUDING THE SAME

BACKGROUND OF THE INVENTION

1. Field of the Invention

The present invention relates to zoom lens systems suitable for use as image-taking lenses of image pickup apparatuses such as a video camera, a monitoring camera, a digital still camera, a broadcast camera, and a silver-halide film camera.

2. Description of the Related Art

Examples of an image pickup apparatus include a video camera, a digital still camera, and a broadcast camera each including a solid-state image pickup device, and a silver-halide film camera. While the functionality of recent image pickup apparatuses is becoming higher, the sizes thereof are becoming smaller.

Image-taking lenses (image-taking optical systems) to be included in such image pickup apparatuses are desired to be compact zoom lens systems with short total lens lengths and high zoom ratios.

To satisfy such a demand, there are zoom lens systems each including four lens units: first to fourth lens units having positive, negative, positive, and positive refractive powers, respectively, in order from an object side to an image side.

Some of these zoom lens systems are of a rear-focus type in which the second lens unit is moved for zooming and the fourth lens unit is responsible for focusing and correction of image-plane variation occurring during zooming, as disclosed in, for example, US Patent Laid-Open No. 2006/0146417, U.S. Pat. No. 7,199,942, Japanese Patent Laid-Open No. 2002-182109, Japanese Patent Laid-Open No. 2002-287027, U.S. Pat. No. 6,118,593, and Japanese Patent Laid-Open No. 2000-227548.

In a zoom lens system including four lens units and employing the rear-focus method, the effective diameter of the first lens unit is small and the overall size of the lens system can be reduced easily, compared with a zoom lens system in which the first lens unit is moved for focusing.

In such a rear-focus zoom lens system, however, a large aberration variation occurs during focusing with the fourth lens unit, making it difficult to realize high optical performance over the entire object-distance range from an object at infinity to a near object.

Therefore, to realize good optical performance over the entire object-distance range while reducing the size and increasing the zoom ratio of a zoom lens system, it is important to appropriately set the zoom type, the refractive powers and configurations of the lens units, and so forth.

In the foregoing rear-focus zoom lens system including four lens units, it is particularly important to appropriately set the configuration of the fourth lens unit that moves during zooming and focusing.

If the fourth lens unit has an inappropriate configuration, aberration variation occurring during zooming and aberration variation occurring during focusing with the fourth lens unit become large, making it difficult to realize high optical performance over the entire zoom range and the entire object-distance range.

SUMMARY OF THE INVENTION

According to an aspect of the present invention, a zoom lens system includes, in order from an object side to an image side, a first lens unit having a positive refractive power, a second lens unit having a negative refractive power, a third lens unit having a positive refractive power, and a fourth lens unit having a positive refractive power. The third lens unit is stationary and the second and fourth lens units move along an optical axis during zooming. The fourth lens unit consists of a cemented lens in which a positive lens element and a negative lens element are cemented together. The zoom lens system satisfies the following conditional expression:

$$7.5 < |R42|/TD4 < 20.0$$

where R42 denotes a radius of curvature of a cemented surface of the cemented lens, and TD4 denotes a thickness of the fourth lens unit along the optical axis.

Thus, there can be provided a compact zoom lens system having a high zoom ratio and realizing high optical performance over the entire zoom range and the entire object-distance range.

Further features of the present invention will become apparent from the following description of exemplary embodiments with reference to the attached drawings.

BRIEF DESCRIPTION OF THE DRAWINGS

FIG. 1 is a cross-sectional view of a zoom lens system according to a first exemplary embodiment of the present invention at a wide-angle end.

FIGS. 2A, 2B, and 2C are diagrams each showing aberrations occurring in the zoom lens system of the first exemplary embodiment.

FIG. 3 is a cross-sectional view of a zoom lens system according to a second exemplary embodiment of the present invention at a wide-angle end.

FIGS. 4A, 4B, and 4C are diagrams each showing aberrations occurring in the zoom lens system of the second exemplary embodiment.

FIGS. 6A, 6B, and 6C are diagrams each showing aberrations occurring in the zoom lens system of the third exemplary embodiment.

FIG. 7 is a cross-sectional view of a zoom lens system according to a fourth exemplary embodiment of the present invention at a wide-angle end.

FIGS. 8A, 8B, and 8C are diagrams each showing aberrations occurring in the zoom lens system of the fourth exemplary embodiment.

DESCRIPTION OF THE EMBODIMENTS

A zoom lens system according to a general embodiment of the present invention includes four lens units and has a reduced overall size with a high zoom ratio.

The zoom lens system of the general embodiment includes, in order from an object side to an image side, a first lens unit having a positive refractive power, a second lens unit having a negative refractive power, a third lens unit having a positive refractive power, and a fourth lens unit having a positive refractive power.

During zooming, the third lens unit is stationary but the second and fourth lens units move along an optical axis.

During focusing, the fourth lens unit moves along the optical axis.

FIG. 1 is a cross-sectional view of a zoom lens system according to a first exemplary embodiment of the present invention at a wide-angle end (a short-focal-length end).

FIGS. 2A, 2B, and 2C are diagrams showing aberrations occurring in the zoom lens system of the first exemplary embodiment at the wide-angle end, at an intermediate zooming position, and at a telephoto end (a long-focal-length end), respectively.

FIG. 3 is a cross-sectional view of a zoom lens system according to a second exemplary embodiment of the present invention at a wide-angle end. FIGS. 4A, 4B, and 4C are diagrams showing aberrations occurring in the zoom lens system of the second exemplary embodiment at the wide-angle end, at an intermediate zooming position, and at a telephoto end, respectively.

Figure 5:
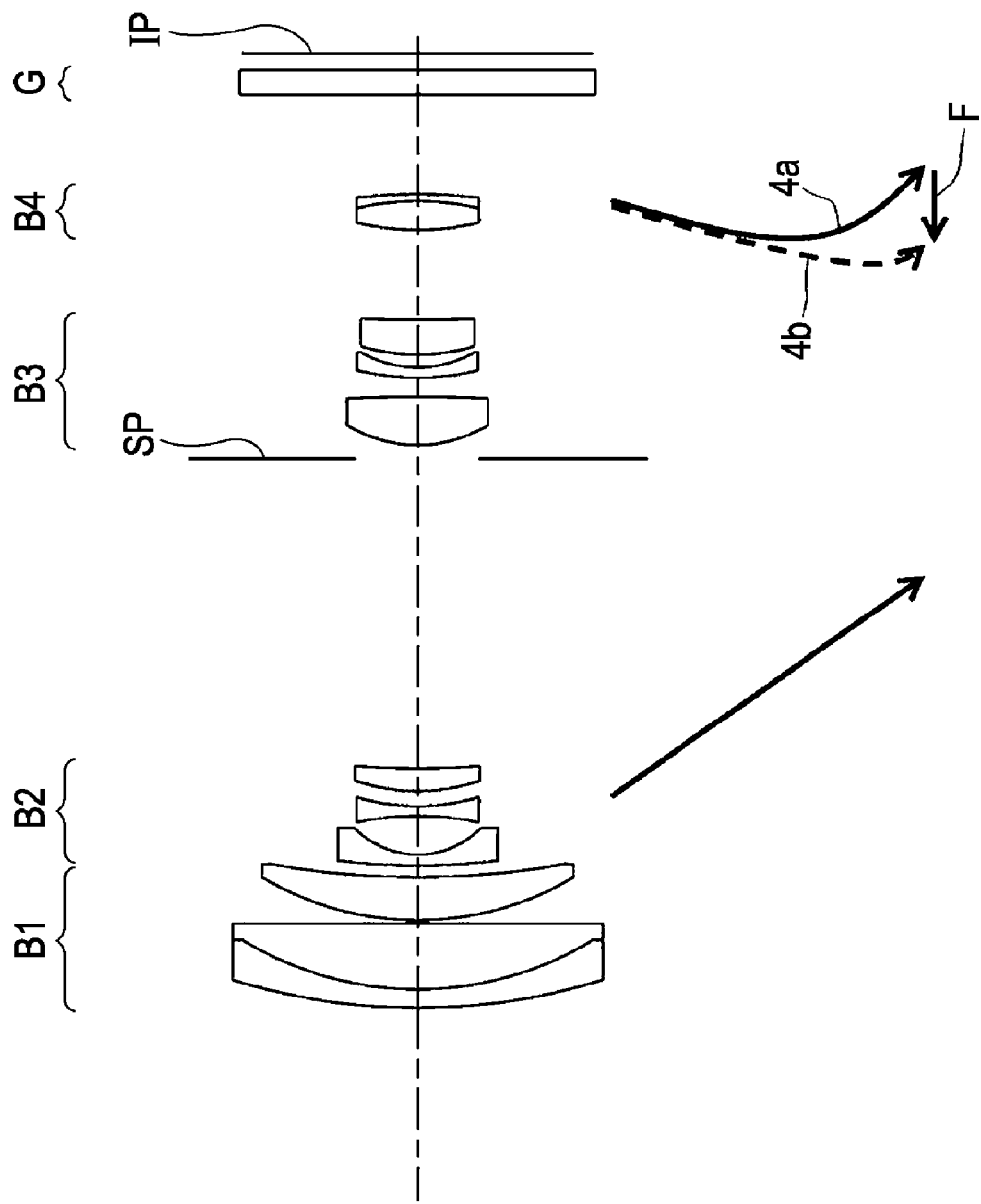
FIG. 5 is a cross-sectional view of a zoom lens system according to a third exemplary embodiment of the present invention at a wide-angle end.
Figure 6A:
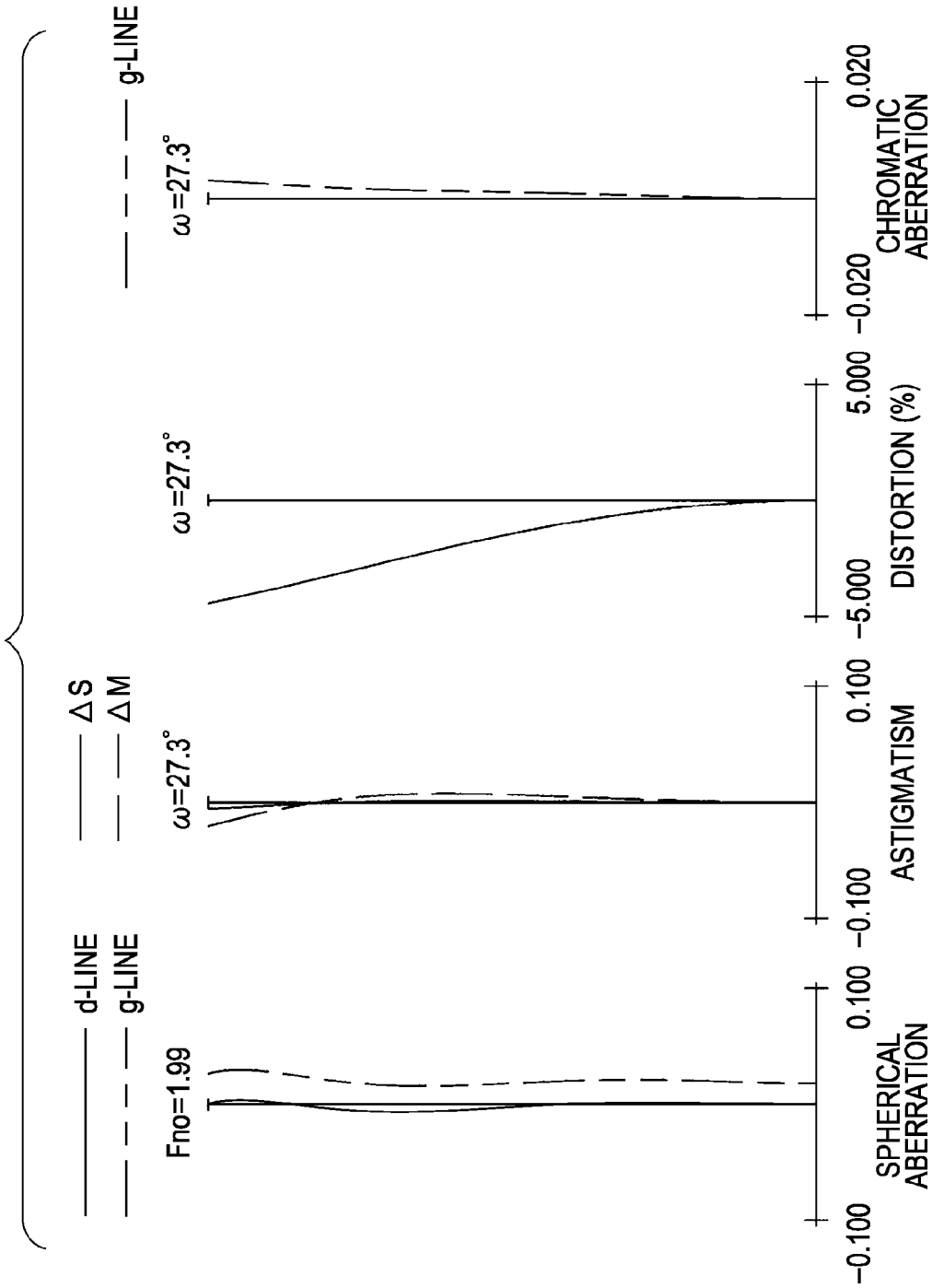

FIG. 5 is a cross-sectional view of a zoom lens system according to a third exemplary embodiment of the present invention at a wide-angle end. FIGS. 6A, 6B, and 6C are diagrams showing aberrations occurring in the zoom lens system of the third exemplary embodiment at the wide-angle end, at an intermediate zooming position, and at a telephoto end, respectively.

FIG. 7 is a cross-sectional view of a zoom lens system according to a fourth exemplary embodiment of the present invention at a wide-angle end. FIGS. 8A, 8B, and 8C are diagrams showing aberrations occurring in the zoom lens system of the fourth exemplary embodiment at the wide-angle end, at an intermediate zooming position, and at a telephoto end, respectively.

Figure 9:
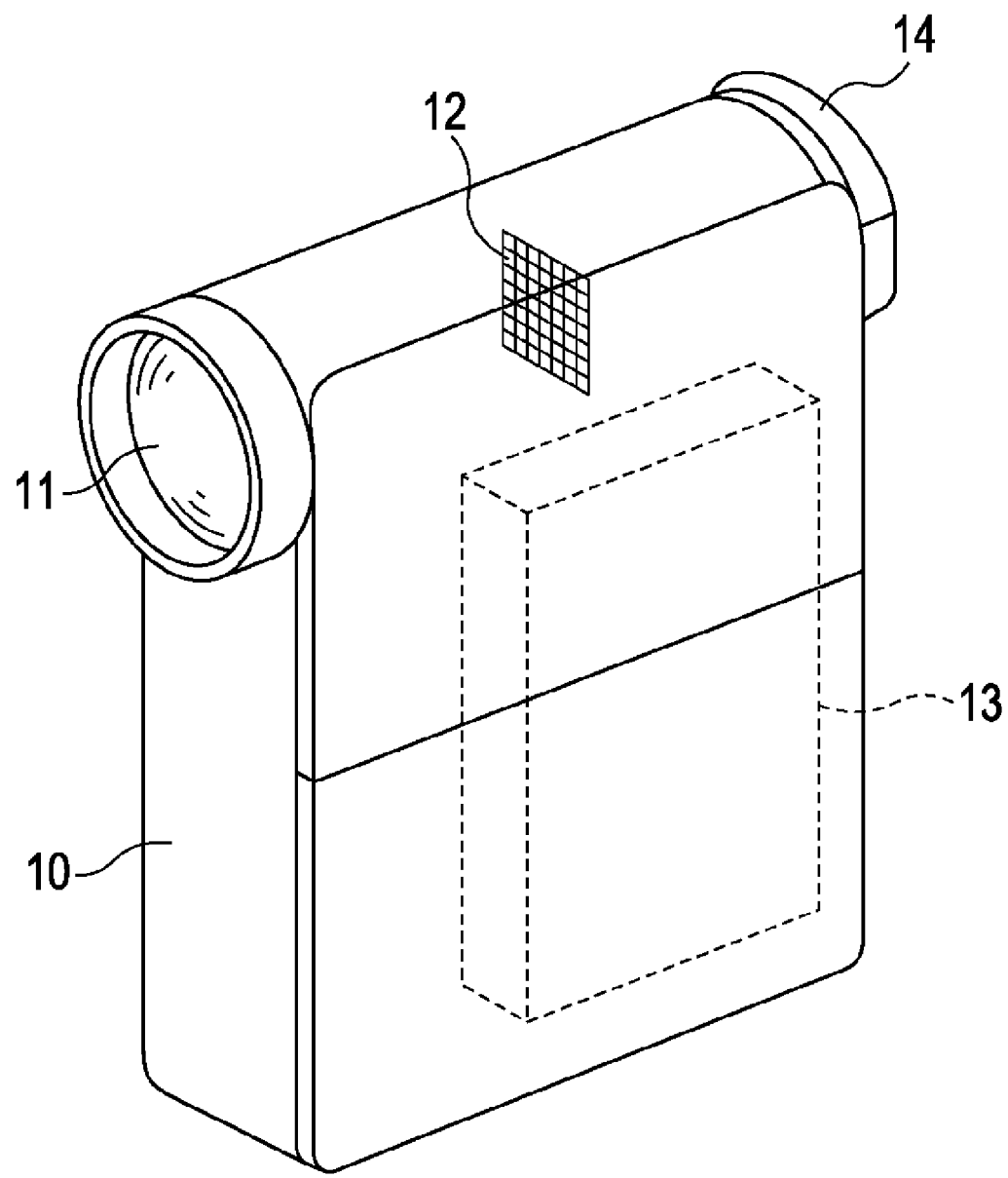
FIG. 9 schematically shows relevant parts of a digital camera to which any of the zoom lens systems according to the first to fourth exemplary embodiments of the present invention is applied.

FIG. 9 schematically shows relevant parts of a digital video camera (an image pickup apparatus) including any of the zoom lens systems according to the first to fourth exemplary embodiments of the present invention.

The zoom lens systems of the first to fourth exemplary embodiments are each an image-taking lens system to be included in an image pickup apparatus. In each of the cross-sectional views, an object resides on the left (front) side, and an image is formed on the right (rear) side.

In a case where the zoom lens system of each exemplary embodiment serves as a projection lens of a projector or the like, a screen resides on the left side, and an image is projected from the right side.

Referring to each cross-sectional view, the zoom lens system includes a first lens unit B1 having a positive refractive power (an optical power, i.e., the reciprocal of focal length), a second lens unit B2 having a negative refractive power, a third lens unit B3 having a positive refractive power, and a fourth lens unit B4 having a positive refractive power. An aperture stop SP is positioned on the object side of the third lens unit B3 or within the third lens unit B3.

An optical filter G is an optical block corresponding to a face plate or the like.

An image plane IP corresponds to an image pickup surface of a solid-state image pickup device (a photoelectric conversion element) such as a charge-coupled-device (CCD) sensor or a complementary-metal-oxide-semiconductor (CMOS) sensor when the zoom lens system is used as an image-taking optical system of a video camera or a digital camera, or a film surface when the zoom lens system is used as an image-taking optical system of a silver-halide film camera.

In each diagram showing spherical aberration, the solid line and the chain double-dashed line represent d-line and g-line, respectively. In each diagram showing astigmatism, the dashed line and the solid line represent the meridional image plane ΔM and the sagittal image plane ΔS, respectively. In each diagram showing chromatic aberration, the chain double-dashed line represent g-line. The f-number and the half angle of view (in degrees) for image taking are denoted by Fno and ω, respectively.

In each of the exemplary embodiments described below, the wide-angle end and the telephoto end are zoom positions at extreme ends of a range in which the lens unit (the second lens unit B2) responsible for zooming is mechanically movable along the optical axis.

In the first, third, and fourth exemplary embodiments shown in FIGS. 1, 5, and 7, zooming from the wide-angle end to the telephoto end is performed by moving the second lens unit B2 toward the image side, as indicated by the arrow. Image-plane variation occurring during zooming is corrected by moving the fourth lens unit B4 along a locus convex toward the object side.

In the second exemplary embodiment shown in FIG. 3, zooming from the wide-angle end to the telephoto end is performed by moving the first lens unit B1 toward the object side and the second lens unit B2 toward the image side, as indicated by the respective arrows. Image-plane variation occurring during zooming is corrected by moving the fourth lens unit B4 along a portion of a locus convex toward the object side.

The zoom lens system of each of the first to fourth exemplary embodiments is of a rear-focus type in which focusing is performed by moving the fourth lens unit B4 along the optical axis. The solid curve 4a and the dashed curve 4b represent the loci of the fourth lens unit B4 when image-plane variation occurring during zooming is to be corrected, with the focus being on an object at infinity and on a near object, respectively. Moving the fourth lens unit B4 along such a locus convex toward the object side enables effective use of the interval between the third lens unit B3 and the fourth lens unit B4, whereby the total lens length can be reduced effectively.

When the focus is changed from an object at infinity to a near object at the telephoto end, the fourth lens unit B4 is moved forward as indicated by the arrow F.

The third lens unit B3 and the aperture stop SP do not move along the optical axis for the purposes of zooming and focusing, but may be moved according to need of aberration correction.

In each of the exemplary embodiments, an additional lens unit having a refractive power may be provided, according to need, at least on one of the object side of the first lens unit B1 and the image side of the fourth lens unit B4. In each of the exemplary embodiments, the fourth lens unit B4 consists of a cemented lens in which a positive lens element and a negative lens element are cemented together.

When the radius of curvature of a cemented surface at which the two lens elements of the cemented lens are cemented together is denoted by R42 and the thickness of the fourth lens unit B4 along the optical axis is denoted by TD4, the following conditional expression is satisfied:

$$7.5 < |R42|/TD4 < 20.0 \tag{1}$$

With the fourth lens unit B4 as the cemented lens consisting of the positive lens element and the negative lens element that are cemented together, variations in chromatic aberration occurring during zooming and during focusing with the fourth lens unit B4 are suppressed.

Conditional Expression (1) defines the radius of curvature of the cemented surface of the cemented lens, serving as the fourth lens unit B4, with respect to the thickness of the fourth lens unit B4.

If the lower limit of Conditional Expression (1) is exceeded, the radius of curvature of the cemented surface of the cemented lens becomes small relative to the thickness of the fourth lens unit B4, and the divergence effect of the cemented surface is increased. Consequently, it becomes difficult to reduce the thickness of the fourth lens unit B4 while appropriately controlling chromatic aberration.

If the upper limit of Conditional Expression (1) is exceeded, the refractive power of the cemented surface becomes too weak. Consequently, it becomes difficult to appropriately correct variation in field curvature occurring during zooming while appropriately controlling chromatic aberration.

To further suppress variation in chromatic aberration occurring during zooming, the range defined by Conditional Expression (1) can be set as follows:

$$7.5<|R42|/TD4<15.0 \quad (1a)$$

It becomes easier to appropriately suppress variation in chromatic aberration and coma occurring at the wide-angle end if the range defined by Conditional Expression (1a) is narrowed as follows:

$$7.5<|R42|/TD4<10.0 \quad (1b)$$

With the configuration described above, each of the exemplary embodiments provides a zoom lens system realizing a high zoom ratio and maintaining a long back focus with a reduced overall size.

The zoom lens system according to each of the exemplary embodiments of the present invention is realized by satisfying the configurational conditions described above. To maintain optical performance more appropriately while maintaining the high zoom ratio and the small size, at least one of conditional expressions given below is desirably satisfied, where the following denotation applies: the refractive index and Abbe number of a material composing the negative lens element are denoted by nd4n and vd4n, respectively; the Abbe number of a material composing the positive lens element is denoted by vd4p; and the air-equivalent length from the aperture stop SP, provided in the optical path, to the image plane at the telephoto end (if a flat plate such as a filter is provided parallel to and between the last lens surface and the image plane, the thickness of the flat plate is expressed as an air-equivalent value) is denoted by DSP.

Furthermore, the air-equivalent length of the zoom lens system (i.e., the length from a first lens surface to the image plane; if a flat plate such as a filter is provided parallel to and between the last lens surface and the image plane, the thickness of the flat plate is expressed as an air-equivalent value) at the telephoto end is denoted by TD.

Furthermore, the thickness of the third lens unit B3, including three lens elements or less, along the optical axis is denoted by TD3; the focal length of the zoom lens system at the telephoto end is denoted by fT; and the focal lengths of the first, third, and fourth lens units B1, B3, and B4 are denoted by f1, f3, and f4, respectively.

The conditional expressions are as follows:

$$1.9<nd4n<2.5 \quad (2)$$

$$1.3<vd4p/vd4n<5.0 \quad (3)$$

$$0.05<TD4/DSP<0.40 \quad (4)$$

$$0.2<DSP/TD<0.5 \quad (5)$$

$$0.1<TD4/TD3<0.4 \quad (6)$$

$$0.3<f1/fT<0.7 \quad (7)$$

$$0.8<f3/f4<1.3 \quad (8)$$

Technical meanings of the conditional expressions will now be described.

Conditional Expression (2) defines the refractive index of the material composing the negative lens element of the fourth lens unit B4.

If the lower limit of Conditional Expression (2) is exceeded and the refractive index of the material composing the negative lens element becomes small, the radius of curvature of the cemented surface becomes small so that a predetermined refractive power is provided. This disadvantageously makes it difficult to correct variation in field curvature occurring during zooming and coma, and to reduce the thickness of the fourth lens unit B4.

If the upper limit of Conditional Expression (2) is exceeded and the refractive index of the material composing the negative lens element becomes large, the radius of curvature of the cemented surface becomes large. This disadvantageously reduces the effect of correction of aberrations, in particular, lateral chromatic aberration.

The balance between the thinning of the fourth lens unit B4 and the effect of aberration correction produced by the cemented surface of the cemented lens can be advantageously improved by setting the range defined by Conditional Expression (2) as follows:

$$1.9<nd4n<2.2 \quad (2a)$$

Conditional Expression (3) defines the ratio between the Abbe numbers of the materials composing the positive lens element of the fourth lens unit B4 and the material composing the negative lens element of the fourth lens unit B4, and concerns appropriate correction of, mainly, chromatic aberration.

By appropriately combining lens materials within the range defined by Conditional Expression (3), lateral chromatic aberration occurring particularly near and at the wide-angle end and variation in longitudinal chromatic aberration occurring during zooming can be corrected easily with good balance.

If the lower limit of Conditional Expression (3) is exceeded and the ratio between the Abbe numbers becomes small, the radius of curvature of the cemented surface of the fourth lens unit B4 becomes small for effective achromatization. This makes it difficult to correct various aberrations.

If the upper limit of Conditional Expression (3) is exceeded and the ratio between the Abbe numbers becomes large, the radius of curvature of the cemented surface of the fourth lens unit B4 becomes large. This makes it difficult to correct, with good balance, variation in longitudinal chromatic aberration occurring during zooming while appropriately correcting variation in the angle of view of coma.

The balance between the effect of achromatization produced by the fourth lens unit B4 and the effect of aberration correction produced by the cemented surface of the cemented lens can be advantageously improved by setting the range defined by Conditional Expression (3) as follows:

$$2.0<vd4p/vd4n<4.0 \quad (3a)$$

Conditional Expression (4) defines the thickness of the fourth lens unit B4 along the optical axis normalized by the air-equivalent length from the aperture stop SP to the image plane at the telephoto end. By satisfying Conditional Expression (4), reduction of the total lens length (the distance from the first lens surface to the image plane) and improvement of performance are balanced with each other while the zoom ratio is increased.

If the lower limit of Conditional Expression (4) is exceeded, the zoom ratio can be increased easily, but it becomes difficult to appropriately correct coma near and at the wide-angle end.

If the upper limit of Conditional Expression (4) is exceeded, the total lens length can be reduced easily, but it becomes difficult to realize high optical performance, that is, to suppress, in particular, variation in field curvature occurring during zooming.

It advantageously becomes easier to increase the zoom ratio and to reduce the total lens length if the range defined by Conditional Expression (4) is set as follows:

$$0.05 < TD4/DSP < 0.25 \tag{4a}$$

Conditional Expression (5) defines the normalized position of the aperture stop SP in the zoom lens system.

If the lower limit of Conditional Expression (5) is exceeded, off-axis rays to be incident on the first lens unit B1, near and at the wide-angle end, travel along paths farther from the optical axis. This disadvantageously increases the effective diameter of the first lens unit B1.

If the upper limit of Conditional Expression (5) is exceeded, the power of the second lens unit B2 becomes too strong. This increases the amount of aberrations, in particular, field curvature, caused by the second lens unit B2. To appropriately correct such aberrations, disadvantageous changes need to be made: for example, increase of the number of lens elements, and addition of aspherical surfaces.

The range defined by Conditional Expression (5) can also be set as follows:

$$0.30 < DSP/TD < 0.45 \tag{5a}$$

Conditional Expression (6) defines the thicknesses of the fourth lens unit B4 and the third lens unit B3 along the optical axis.

The lower limit of Conditional Expression (6) is exceeded when the thickness of the fourth lens unit B4 becomes relatively small or when the thickness of the third lens unit B3 becomes relatively large.

If the thickness of the fourth lens unit B4 becomes small and the lower limit of Conditional Expression (6) is exceeded, it becomes difficult to provide a strong positive refractive power to the fourth lens unit B4. Moreover, it becomes difficult to provide a sufficiently high zoom ratio to the zoom lens system in which the fourth lens unit B4 functions as a compensator that corrects the image plane.

In contrast, if the thickness of the third lens unit B3 becomes large and the lower limit of Conditional Expression (6) is exceeded, the effective diameter of the fourth lens unit B4, positioned on the image side of the third lens unit B3, disadvantageously becomes large.

The range defined by Conditional Expression (6) can also be set as follows:

$$0.20 < TD4/TD3 < 0.39 \tag{6a}$$

Conditional Expression (7) defines the ratio of the focal length of the first lens unit B1 to the focal length of the zoom lens system at the telephoto end.

If the lower limit of Conditional Expression (7) is exceeded, the refractive power of the first lens unit B1 becomes strong. This is advantageous in reducing the total lens length, but is disadvantageous in that tilting of image plane due to manufacturing errors and image shake during zooming may occur frequently, making it necessary to provide a lens barrel with high accuracy.

If the upper limit of Conditional Expression (7) is exceeded, the amount of travel of the first lens unit B1 or the second lens unit B2 required for zooming becomes large. This disadvantageously makes it difficult to sufficiently reduce the total lens length of the zoom lens system.

Chromatic aberration and spherical aberration at the telephoto end can be appropriately corrected if the range defined by Conditional Expression (7) is set as follows:

$$0.4 < f1/fT < 0.6 \tag{7a}$$

Conditional Expression (8) defines the ratio of the focal length of the third lens unit B3 to the focal length of the fourth lens unit B4.

If the lower limit of Conditional Expression (8) is exceeded, rays that are output from the third lens unit B3 are strongly converged. This disadvantageously shortens the back focus.

If the upper limit of Conditional Expression (8) is exceeded, the total lens length disadvantageously becomes large.

The range defined by Conditional Expression (8) can also be set as follows:

$$0.7 < f3/f4 < 1.2 \tag{8a}$$

In each of the exemplary embodiments, to reduce the total lens length, the third lens unit B3 desirably includes three lens elements or less. Furthermore, to provide a predetermined brightness at the wide-angle end, the third lens unit B3 desirably includes an aspherical lens element.

In each of the exemplary embodiments, image blurring occurring when the entirety of the optical system is shook (tilted) may be corrected by having the third lens unit B3 be movable in a direction containing a component perpendicular to the optical axis.

In each of the exemplary embodiments, the aperture stop SP is fixed (stationary) relative to the image-forming plane (the image plane) during zooming. This eliminates the necessity of providing an actuator that moves the aperture stop SP during zooming, whereby the configuration of the zoom lens system is simplified.

As in the first, third, and fourth exemplary embodiments, the first lens unit B1 and the third lens unit B3 may be fixed during zooming, so that only two of the lens units are movable. Thus, the total lens length can be advantageously kept unchanged during zooming.

If the third lens unit B3 includes a lens element having an aspherical surface, good imaging performance can be advantageously maintained even with a large aperture ratio.

In each of the exemplary embodiments, the first lens unit B1 includes a cemented lens in which a meniscus negative lens element having a convex object-side surface and a positive lens element are cemented together, and a meniscus positive lens element having a convex object-side surface.

The second lens unit B2 includes a meniscus negative lens element having a convex object-side surface, a biconcave negative lens element, and a positive lens element having a convex object-side surface.

The third lens unit B3 includes a positive lens element having an aspherical surface, a negative lens element having a concave image-side surface, and a positive lens element having a convex object-side surface.

Alternatively, the third lens unit B3 includes a positive lens element having an aspherical surface, and a negative lens element having a concave image-side surface.

The fourth lens unit B4 consists of a cemented lens in which a biconvex positive lens element and a negative lens element are cemented together.

Alternatively, the fourth lens unit B4 consists of a cemented lens in which a negative lens element having a concave image-side surface and a positive lens element are cemented together.

According to each of the exemplary embodiments, the shares of zooming ratios of the respective lens units are appropriately set with the configurations and power assignment described above, whereby a zoom lens system realizing a high zoom ratio and high imaging performance is provided.

Specifically, according to each of the exemplary embodiments, a zoom lens system realizing a zoom ratio of 10 or higher despite its small overall size and high optical performance can be provided.

Another embodiment of the present invention will now be described with reference to FIG. 9. This embodiment concerns a digital video camera in which the zoom lens system of any of the above exemplary embodiments is included as an image-taking optical system.

The camera shown in FIG. 9 includes a video camera body 10, and an image-taking optical system 11, which is the zoom lens system of any of the first to fourth exemplary embodiments.

The camera further includes, in the video camera body 10, a solid-state image pickup device (a photoelectric conversion element) 12, such as a CCD sensor or a CMOS sensor, that receives an optical image of an object formed by the image-taking optical system 11, and a recording unit 13 that records information on the object image subjected to photoelectric conversion by the solid-state image pickup device 12.

The digital video camera further includes a finder 14 through which the object image displayed on a display device (not shown) is observed.

The display device includes a liquid crystal panel or the like, and displays the object image formed on the solid-state image pickup device 12.

Thus, by applying the zoom lens system according to any of the exemplary embodiments of the present invention to an image pickup apparatus such as a digital still camera or a video camera, an image pickup apparatus having a small size and high optical performance can be realized.

Numerical examples corresponding to the first to fourth exemplary embodiments will now be provided.

In each of the numerical examples, i denotes the order of the lens surface counted from the object side, ri denotes the radius of curvature of the i-th surface counted from the object side, di denotes the lens thickness defined by and the air gap between the i-th surface and the (i+1)-th surface counted from the object side, ndi and vdi denote the refractive index and the Abbe number, respectively, of the material composing the i-th optical member counted from the object side. Relationships between Conditional Expressions (1) to (8) and Numerical Examples 1 to 4 are summarized in Table 1.

When the optical axis is defined as the X axis; the direction perpendicular to the optical axis is defined as the H axis; the direction in which light travels is defined as the positive direction; the paraxial radius of curvature is denoted by R; the conic constant is denoted by K; and the aspherical surface coefficients are denoted by A4 to A10, respectively, the shape of an aspherical surface is expressed as follows:

$$X = \frac{\frac{H^2}{R}}{1 + \sqrt{1 - (1+K)\left(\frac{H}{R}\right)^2}} + A4H^4 + A6H^6 + A8H^8 + A10H^{10}$$

In each of the numerical examples, the asterisk (*) indicates that the surface is aspherical, "e-x" denotes "$10^{-x}$", Fno denotes the f-number, and ω denotes the angle of view.

Numerical Example 1

Unit: mm

Surface Data

| Surface number | r | d | nd | vd |
|---|---|---|---|---|
| 1 | 38.308 | 1.15 | 1.84666 | 23.9 |
| 2 | 20.841 | 4.30 | 1.60311 | 60.6 |
| 3 | ∞ | 0.20 | | |
| 4 | 19.937 | 2.60 | 1.69680 | 55.5 |
| 5 | 55.328 | (Variable) | | |
| 6 | 36.632 | 0.60 | 1.88300 | 40.8 |
| 7 | 4.951 | 2.24 | | |
| 8 | −22.767 | 0.60 | 1.77250 | 49.6 |
| 9 | 12.886 | 0.54 | | |
| 10 | 9.947 | 1.40 | 1.92286 | 18.9 |
| 11 | 42.747 | (Variable) | | |
| 12* | 10.730 | 2.55 | 1.58313 | 59.4 |
| 13* | −37.223 | 1.40 | | |
| 14(Stop) | ∞ | 2.30 | | |
| 15 | 76.986 | 0.60 | 1.76182 | 26.5 |
| 16 | 9.600 | 0.22 | | |
| 17 | 12.605 | 2.00 | 1.48749 | 70.2 |
| 18 | −23.245 | (Variable) | | |
| 19 | 15.256 | 1.80 | 1.77250 | 49.6 |
| 20 | −19.828 | 0.55 | 1.92286 | 18.9 |
| 21 | −50.464 | (Variable) | | |
| 22 | ∞ | 1.50 | 1.51633 | 64.1 |
| 23 | ∞ | 1.00 | | |
| Image plane | ∞ | | | |

Aspherical Surface Data

12th Surface

K=2.16457e-001 A 4=−2.58526e-005 A 6=−1.06474e-006 A 8=3.81986e-008 A10=−8.07093e-010

13th Surface

K=0.00000e+000 A 4=1.85304e-004 A 6=−5.42864e-007

Other Data

Zoom ratio 14.73

| | Wide-angle | Intermediate | Telephoto |
|---|---|---|---|
| Focal length | 4.22 | 27.15 | 62.17 |
| F-number | 1.85 | 2.96 | 3.20 |
| Angle of view | 28.06 | 4.74 | 2.07 |
| Image height | 2.25 | 2.25 | 2.25 |
| Total lens length | 59.92 | 59.92 | 59.92 |
| BF | 8.14 | 11.98 | 6.04 |
| d 5 | 0.65 | 16.30 | 19.73 |
| d11 | 19.88 | 4.23 | 0.80 |
| d18 | 6.20 | 2.36 | 8.30 |
| d21 | 6.15 | 9.99 | 4.05 |

Zoom Lens Unit Data

| Unit | Starting surface | Focal length |
|---|---|---|
| 1 | 1 | 30.50 |
| 2 | 6 | −5.76 |
| 3 | 12 | 16.40 |
| 4 | 19 | 16.51 |
| 5 | 22 | ∞ |

Numerical Example 2

Unit: mm
Surface Data

| Surface number | r | d | nd | vd |
|---|---|---|---|---|
| 1 | 39.416 | 1.00 | 1.84666 | 23.8 |
| 2 | 20.944 | 4.18 | 1.60311 | 60.6 |
| 3 | −9330.579 | 0.18 | | |
| 4 | 20.158 | 2.83 | 1.71300 | 53.9 |
| 5 | 57.829 | (Variable) | | |
| 6 | 38.906 | 0.60 | 1.88300 | 40.8 |
| 7 | 4.766 | 2.15 | | |
| 8 | −18.473 | 0.50 | 1.86254 | 41.4 |
| 9 | 16.399 | 0.41 | | |
| 10 | 10.453 | 1.62 | 1.92286 | 18.9 |
| 11 | 215.693 | (Variable) | | |
| 12* | 7.572 | 2.30 | 1.58313 | 59.4 |
| 13 | −45.145 | 1.00 | | |
| 14(Stop) | ∞ | 1.70 | | |
| 15 | 23.972 | 0.50 | 1.84666 | 23.8 |
| 16 | 7.244 | 0.80 | | |
| 17 | 25.104 | 1.30 | 1.48749 | 70.2 |
| 18 | −24.604 | (Variable) | | |
| 19 | 11.220 | 1.65 | 1.88300 | 40.8 |
| 20 | −31.419 | 0.45 | 2.14352 | 17.8 |
| 21 | −2058.495 | (Variable) | | |
| 22 | ∞ | 1.50 | 1.54400 | 60.0 |
| 23 | ∞ | 1.00 | | |
| Image plane | ∞ | | | |

Aspherical Surface Data
12th Surface
K=2.41274e-001 A 4=−3.87279e-004 A 6=−2.78067e-006 A 8=−1.05141e-007
Other Data
  Zoom ratio 11.87

| | Wide-angle | Intermediate | Telephoto |
|---|---|---|---|
| Focal length | 4.42 | 21.36 | 52.51 |
| F-number | 2.00 | 2.76 | 3.20 |
| Angle of view | 26.96 | 6.01 | 2.45 |
| Image height | 2.25 | 2.25 | 2.25 |
| Total lens length | 53.51 | 57.09 | 57.96 |
| BF | 8.42 | 10.60 | 5.87 |
| d 5 | 0.70 | 15.25 | 19.45 |
| d11 | 16.94 | 5.97 | 2.63 |
| d18 | 4.29 | 2.12 | 6.85 |
| d21 | 6.45 | 8.63 | 3.90 |

Zoom Lens Unit Data

| Unit | Starting surface | Focal length |
|---|---|---|
| 1 | 1 | 30.23 |
| 2 | 6 | −5.88 |
| 3 | 12 | 16.33 |
| 4 | 19 | 13.99 |
| 5 | 22 | ∞ |

Numerical Example 3

Unit: mm
Surface Data

| Surface number | r | d | nd | vd |
|---|---|---|---|---|
| 1 | 37.786 | 1.10 | 1.84666 | 23.8 |
| 2 | 20.232 | 3.96 | 1.60311 | 60.6 |
| 3 | −2159.128 | 0.18 | | |
| 4 | 18.260 | 2.54 | 1.69680 | 55.5 |
| 5 | 49.651 | (Variable) | | |
| 6 | 42.180 | 0.65 | 1.88300 | 40.8 |
| 7 | 5.328 | 2.31 | | |
| 8 | −19.325 | 0.60 | 1.71300 | 53.9 |
| 9 | 12.919 | 0.90 | | |
| 10 | 11.641 | 1.34 | 1.92286 | 18.9 |
| 11 | 55.351 | (Variable) | | |
| 12(Stop) | ∞ | 0.80 | | |
| 13* | 7.729 | 2.91 | 1.58313 | 59.4 |
| 14 | −96.380 | 1.14 | | |
| 15 | 15.548 | 0.60 | 1.80518 | 25.4 |
| 16 | 6.869 | 0.76 | | |
| 17* | 11.643 | 2.08 | 1.58313 | 59.4 |
| 18 | 101.482 | (Variable) | | |
| 19 | 16.479 | 1.70 | 1.77250 | 49.6 |
| 20 | −15.999 | 0.40 | 2.14352 | 17.8 |
| 21 | −34.189 | (Variable) | | |
| 22 | ∞ | 1.50 | 1.51633 | 64.1 |
| 23 | ∞ | 1.00 | | |
| Image plane | ∞ | | | |

Aspherical Surface Data
13th surface
  K=5.22124e-001 A 4=−3.33506e-004 A 6=−4.12115e-006 A 8=−1.76870e-007
17th Surface
  K=−2.05164e+000 A 4=3.38348e-005
Other Data
  Zoom ratio 10.95

| | Wide-angle | Intermediate | Telephoto |
|---|---|---|---|
| Focal length | 4.37 | 20.00 | 47.83 |
| F-number | 1.99 | 2.76 | 3.00 |
| Angle of view | 27.26 | 6.42 | 2.69 |
| Image height | 2.25 | 2.25 | 2.25 |
| Total lens length | 56.50 | 56.50 | 56.50 |
| BF | 7.94 | 11.02 | 6.52 |
| d 5 | 0.70 | 13.53 | 17.59 |
| d11 | 18.50 | 5.66 | 1.61 |
| d18 | 5.37 | 2.30 | 6.80 |
| d21 | 5.95 | 9.03 | 4.53 |

Zoom Lens Unit Data

| Unit | Starting surface | Focal length |
|---|---|---|
| 1 | 1 | 28.63 |
| 2 | 6 | −5.93 |

-continued

| Unit | Starting surface | Focal length |
|---|---|---|
| 3 | 12 | 14.99 |
| 4 | 19 | 17.69 |
| 5 | 22 | ∞ |

Numerical Example 4

Unit: mm
Surface Data

| Surface number | r | d | nd | vd |
|---|---|---|---|---|
| 1 | 29.563 | 1.00 | 1.84666 | 23.8 |
| 2 | 17.233 | 3.65 | 1.69680 | 55.5 |
| 3 | 95.909 | 0.20 | | |
| 4 | 20.115 | 2.49 | 1.71300 | 53.9 |
| 5 | 44.929 | (Variable) | | |
| 6 | 27.958 | 0.75 | 1.83481 | 42.7 |
| 7 | 4.668 | 2.04 | | |
| 8 | −23.844 | 0.70 | 1.80400 | 46.6 |
| 9 | 12.368 | 0.70 | | |
| 10 | 10.214 | 1.30 | 1.92286 | 18.9 |
| 11 | 50.247 | (Variable) | | |
| 12(Stop) | ∞ | 0.80 | | |
| 13* | 7.898 | 3.25 | 1.58313 | 59.4 |
| 14* | −14.208 | 0.50 | | |
| 15 | 101.527 | 0.70 | 2.00069 | 25.5 |
| 16 | 12.973 | (Variable) | | |
| 17 | 20.095 | 0.40 | 2.00069 | 25.5 |
| 18 | 12.800 | 1.30 | 1.72200 | 67.0 |
| 19 | −17.649 | (Variable) | | |
| 20 | ∞ | 1.50 | 1.51633 | 64.1 |
| 21 | ∞ | 1.00 | | |
| Image plane | ∞ | | | |

Aspherical Surface Data
13th Surface
  K=−2.63365e−001 A 4=−1.70414e−005 A 6=1.17295e−005 A 8=2.82997e−007 A10=7.52104e−010
14th Surface
  K=−1.10995e+001 A 4=1.95663e−004 A 6=2.58455e−005
Other Data
  Zoom ratio 13.80

| | Wide-angle | Intermediate | Telephoto |
|---|---|---|---|
| Focal length | 3.80 | 23.36 | 52.43 |
| F-number | 1.85 | 2.29 | 2.93 |
| Angle of view | 25.35 | 4.41 | 1.97 |
| Image height | 1.80 | 1.80 | 1.80 |
| Total lens length | 54.94 | 54.94 | 54.94 |
| BF | 9.26 | 11.64 | 6.95 |
| d 5 | 0.65 | 15.56 | 19.29 |
| d11 | 20.84 | 5.93 | 2.20 |
| d16 | 4.41 | 2.03 | 6.73 |
| d19 | 7.27 | 9.66 | 4.96 |

Zoom Lens Unit Data

| Unit | Starting surface | Focal length |
|---|---|---|
| 1 | 1 | 30.59 |
| 2 | 6 | −5.94 |
| 3 | 12 | 17.13 |

-continued

| Unit | Starting surface | Focal length |
|---|---|---|
| 4 | 17 | 14.73 |
| 5 | 20 | ∞ |

TABLE 1

Values of Conditional Expressions in Numerical Examples

| | Conditional Expression | Example 1 | Example 2 | Example 3 | Example 4 |
|---|---|---|---|---|---|
| | R42 | −19.828 | −31.419 | −15.999 | 12.800 |
| (2) | nd4n | 1.92286 | 2.14352 | 2.14352 | 2.00069 |
| | vd4p | 49.6 | 40.8 | 49.6 | 67.0 |
| | vd4n | 18.9 | 17.8 | 17.8 | 25.5 |
| | TD3 | 9.07 | 7.60 | 7.49 | 4.45 |
| | TD4 | 2.35 | 2.10 | 2.10 | 1.70 |
| | DSP | 21.81 | 19.11 | 23.71 | 20.63 |
| | TD | 59.92 | 57.96 | 56.50 | 54.94 |
| | f1 | 30.50 | 30.23 | 28.63 | 30.59 |
| | f2 | −5.76 | −5.88 | −5.93 | −5.94 |
| | f3 | 16.40 | 16.33 | 14.99 | 17.13 |
| | f4 | 16.51 | 13.99 | 17.69 | 14.73 |
| | fw | 4.22 | 4.42 | 4.37 | 3.80 |
| | fT | 62.17 | 52.51 | 47.83 | 52.43 |
| (1) | |R42|/TD4 | 8.437 | 14.961 | 7.619 | 7.529 |
| (3) | vd4p/vd4n | 2.624 | 2.292 | 2.787 | 2.627 |
| (4) | TD4/DSP | 0.108 | 0.110 | 0.089 | 0.082 |
| (5) | DSP/TD | 0.364 | 0.330 | 0.420 | 0.376 |
| (6) | TD4/TD3 | 0.259 | 0.276 | 0.280 | 0.382 |
| (7) | f1/fT | 0.491 | 0.576 | 0.599 | 0.583 |
| (8) | f3/f4 | 0.993 | 1.167 | 0.847 | 1.163 |

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-272917 filed Oct. 23, 2008, which is hereby incorporated by reference herein in its entirety.

What is claimed is:

1. A zoom lens system comprising, in order from an object side to an image side:
  a first lens unit having a positive refractive power;
  a second lens unit having a negative refractive power;
  a third lens unit having a positive refractive power; and
  a fourth lens unit having a positive refractive power,
  wherein the third lens unit is stationary and the second and fourth lens units move along an optical axis during zooming,
  wherein the fourth lens unit moves along an optical axis during focusing,
  wherein the fourth lens unit consists of a cemented lens in which a positive lens element and a negative lens element are cemented together, and
  wherein the zoom lens system satisfies the following conditional expression:

$$7.5 < |R42|/TD4 < 20.0$$

$$1.9 < nd4n < 2.5$$

$$2.0 < vd4p/vd4n < 5.0$$

where R42 denotes a radius of curvature of a cemented surface of the cemented lens, and TD4 denotes a thickness of the fourth lens unit along the optical axis, nd4n denotes a refractive index of a material composing the negative lens element, vd4p denotes an Abbe number of a material composing the positive lens element, and vd4n denotes an Abbe number of a material composing the negative lens element.

2. The zoom lens system according to claim 1, further comprising an aperture stop,
wherein the zoom lens system satisfies the following conditional expression:

$$0.05 < TD4/DSP < 0.40$$

where DSP denotes an air-equivalent length from the aperture stop to an image plane at a telephoto end.

3. An image pickup apparatus comprising:
the zoom lens system according to claim 2; and
an image pickup device configured to receive an optical image formed by the zoom lens.

4. The zoom lens system according to claim 1, further comprising an aperture stop,
wherein the zoom lens system satisfies the following conditional expression:

$$0.2 < DSP/TD < 0.5$$

where DSP denotes an air-equivalent length from the aperture stop to an image plane at a telephoto end, and TD denotes an air-equivalent length of the zoom lens system at the telephoto end.

5. The zoom lens system according to claim 1,
wherein the third lens unit includes three lens elements or less, and
wherein the zoom lens system satisfies the following conditional expression:

$$0.1 < TD4/TD3 < 0.4$$

where TD3 denotes a thickness of the third lens unit along the optical axis.

6. The zoom lens system according to claim 1, satisfying the following conditional expression:

$$0.3 < f1/fT < 0.7$$

where fT denotes a focal length of the zoom lens system at a telephoto end, and f1 denotes a focal length of the first lens unit.

7. The zoom lens system according to claim 1, satisfying the following conditional expression:

$$0.8 < f3/f4 < 1.3$$

where f3 denotes a focal length of the third lens unit, and f4 denotes a focal length of the fourth lens unit.

8. An image pickup apparatus comprising:
the zoom lens system according to claim 1; and
an image pickup device configured to receive an optical image formed by the zoom lens.

* * * * *